United States Patent Office 3,327,687
Patented June 27, 1967

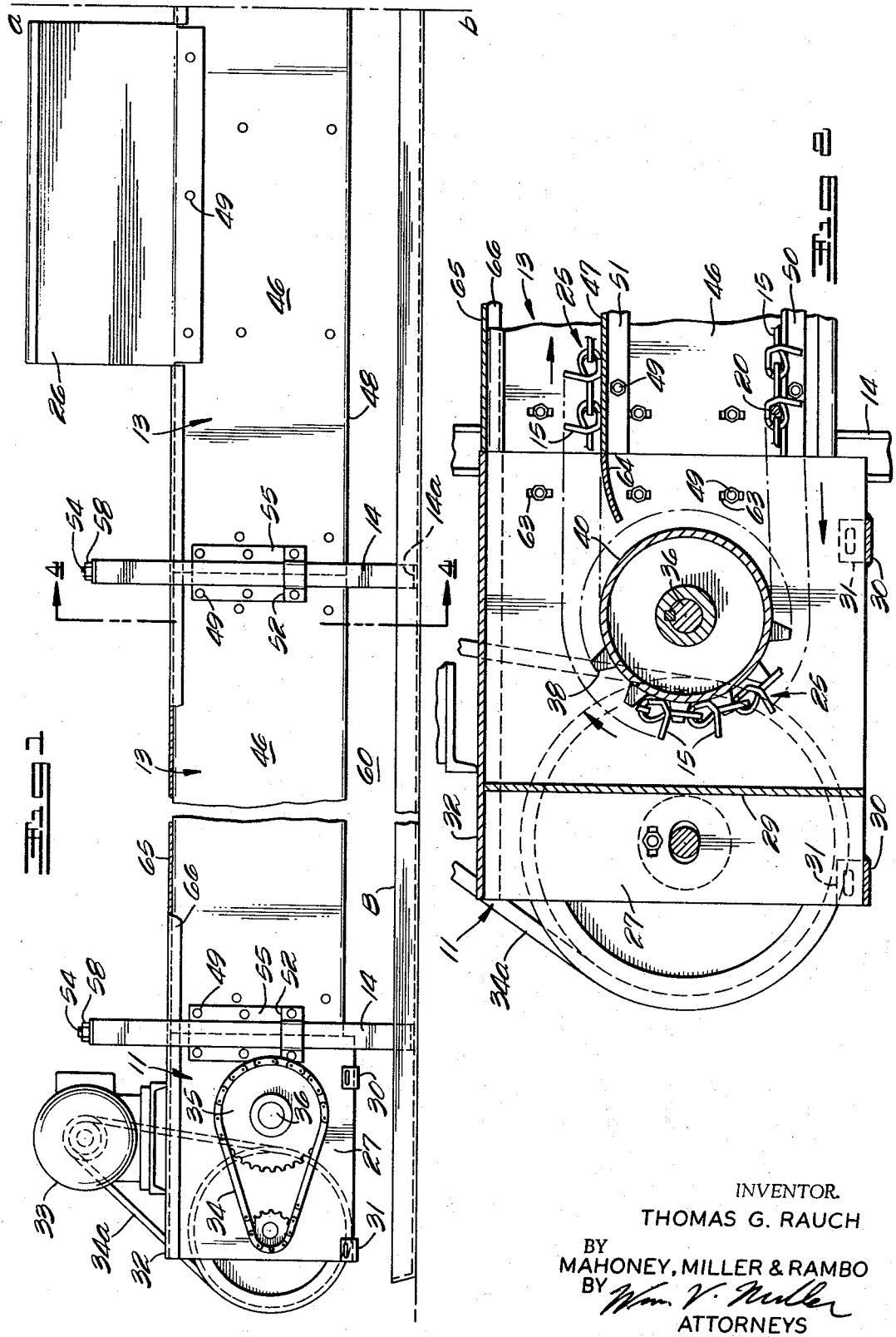

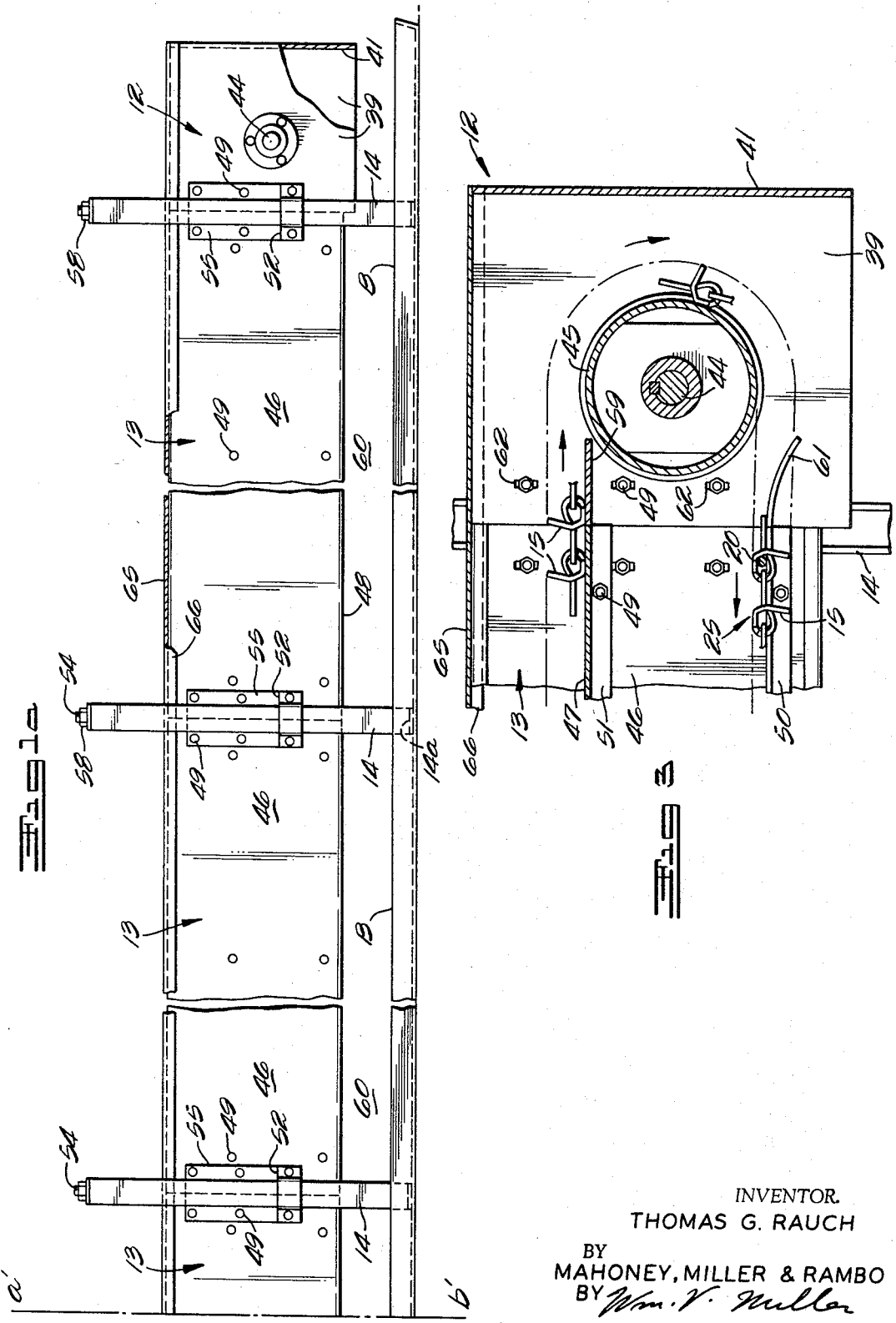

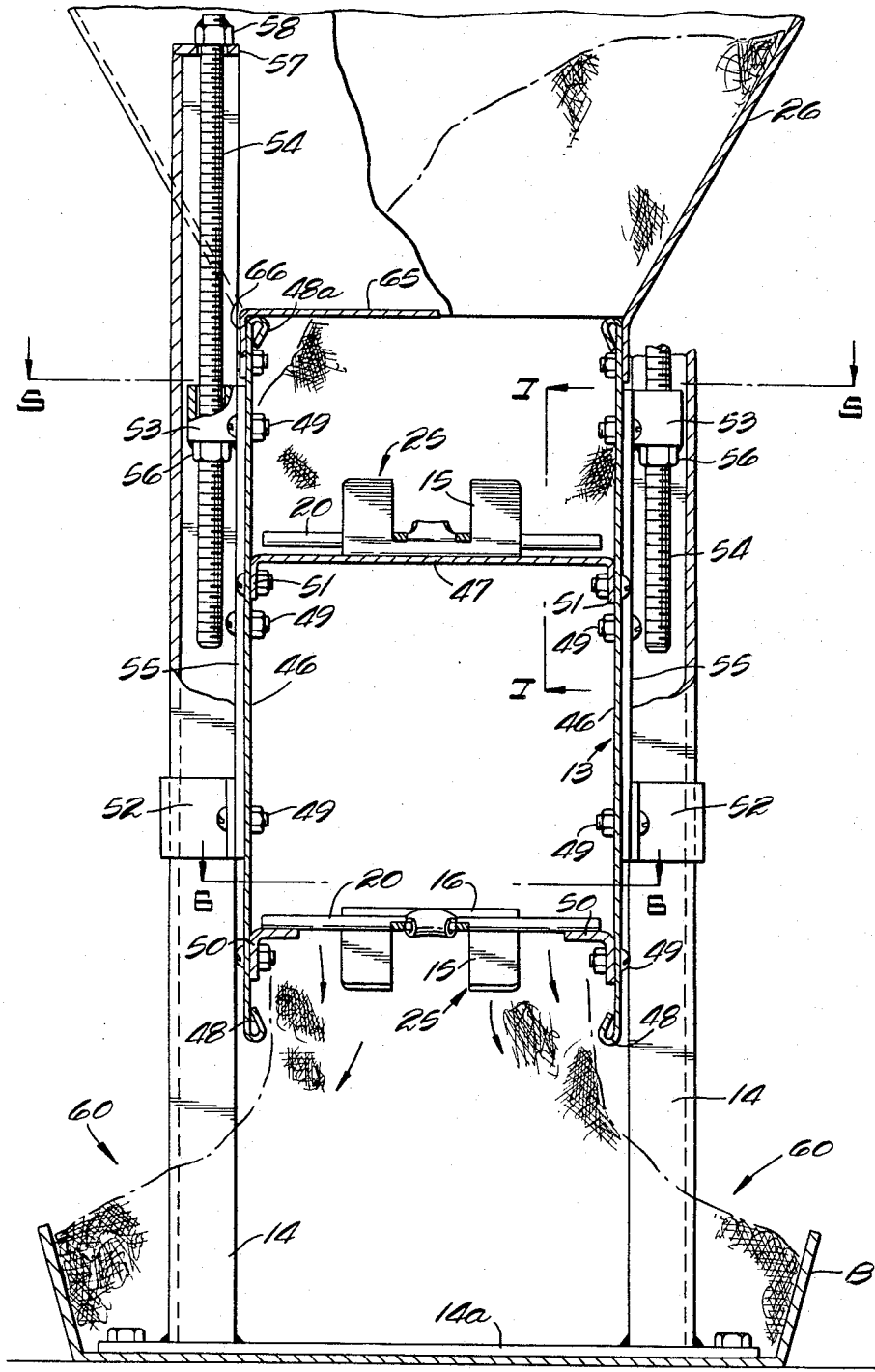

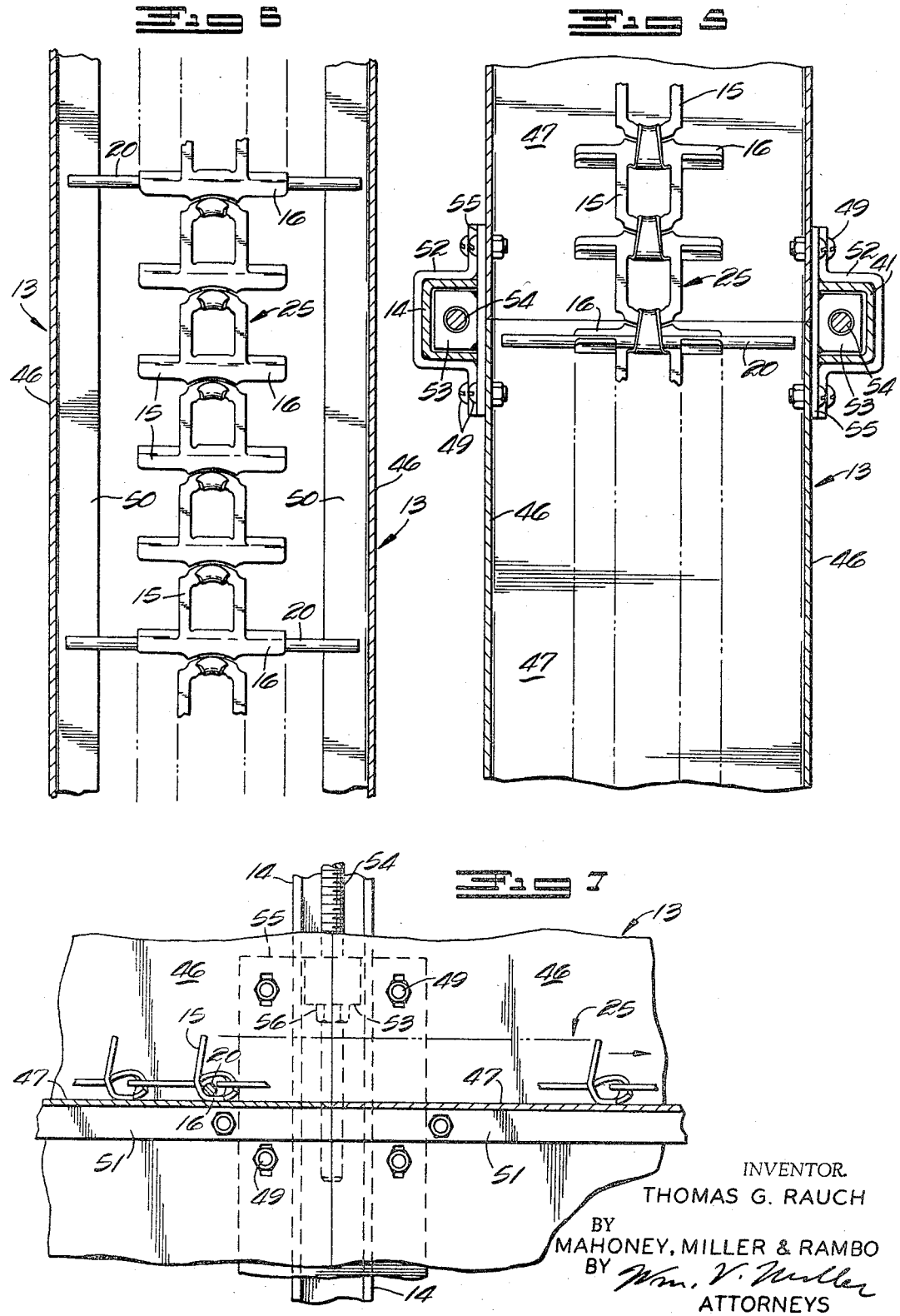

3,327,687
ANIMAL FEEDER
Thomas G. Rauch, Lancaster, Ohio, assignor to McAuley Manufacturing, Inc., Bremen, Ohio, a corporation of Ohio
Filed Apr. 6, 1966, Ser. No. 540,595
1 Claim. (Cl. 119—52)

ABSTRACT OF THE DISCLOSURE

This invention relates to an animal feeder which will be associated with a feed trough or bunk from which the animals may withdraw the feed and which will keep the trough or bunk uniformly supplied with the feed throughout its entire length, replacing any that is eaten by the animals. The present feeder is designed particularly for handling those feeds which are usually fed to livestock and particularly cattle, for example, silage, haylage, grass, hay, corn, etc. Haylage and grass are particularly difficult to feed without jamming but the present feeder is designed to handle even such material without difficulty. The structure includes novel endless material-carrying chain and cooperating material-passage arrangement which provides for large clearances and large openings through which the conveyed feed will readily pass so that the difficult-to-handle grass and haylage will not jam up the feeder.

A preferred embodiment of this invention is illustrated in the accompanying drawings but it will be understood that specific details of this apparatus may be varied without departing from basic principles of the invention.

In these drawings:

FIGURE 1 is a side elevational view of the animal feeder showing an elongated portion at the drive end thereof.

FIGURE 1a is a similar view of the animal feeder but showing an elongated portion at the other or idler end thereof, FIGURE 1a matching at the line a'–b' with FIGURE 1 at the line a–b.

FIGURE 2 is an enlarged vertical longitudinal sectional view mainly through the drive end section of the feeder.

FIGURE 3 is a similar enlarged vertical longitudinal sectional view mainly through the idler end section of the feeder.

FIGURE 4 is an enlarged transverse vertical sectional view taken through the feeder substantially on line 4—4 of FIGURE 1.

FIGURE 5 is a fragmentary horizontal sectional view taken substantially on line 5—5 of FIGURE 4 showing a portion of the upper flight of the feed chain.

FIGURE 6 is a similar fragmentary horizontal sectional view taken substantially on line 6—6 of FIGURE 4 showing a portion of the lower flight of the feed chain.

FIGURE 7 is a vertical longitudinal sectional view taken substantially on line 7—7 of FIGURE 4.

With reference to the drawings, the feeder of this invention is illustrated generally in FIGURES 1 and 1a as being formed of a plurality of longitudinally arranged sections which are connected together in suitable numbers so that the resulting feeder will be of the desired length. In the example shown, there is provided a drive end section 11, an idler end section 12, and a suitable number of intermediate elongated sections 13 which are connected together in longitudinally continuous relationship by means which will be described in detail later. The feeder may be suported over a floor, and preferably over a feed-retaining bunk B formed in or disposed along the floor, by means of the standards or legs 14 arranged at the transverse points between adjacent sections. For conveying the feed along the feeder, an endless chain 25 is provided and for supplying the chain with the feed, a hopper 26 may be located at any selected position along the upper side of the feeder, preferably intermediate the length thereof on one of the sections 13, as indicated in FIGURE 1. A series of hoppers may be placed along the top of the feeder to feed several different types of feed into the feeder.

The chain is composed of interlocking links 15 on which certain links are provided with the transversely extending support pins 20 which are fixed, preferably by welding, on the shelves or flights 16 thereof. These pins 20 may be disposed across the respective shelves 16 and be welded or otherwise secured thereto. They project laterally beyond the ends of the shelves 16 to provide oppositely projecting support portions from the opposed side edges of the chain. The pins may be located longitudinally of the chain at selected intervals but in the example of chain illustrated, they are disposed on every fifth link. They are sufficiently close to prevent undue sagging of the run of the chain when suspended by means of the pins. Instead of providing a single, continuous pin across each link shelf 16, the pin may be formed of two oppositely extending pieces projecting from the ends of the shelf.

The endless chain 25 passes through the feeder sections 11, 12 and 13, having an upper run and a lower run passing therethrough at upper and lower levels as indicated.

The drive section 11 is constructed as indicated best in FIGURES 1 and 2. It is made up of the opposed upright plates or side walls 27 which are joined together by a transverse upright end wall 29 and transverse spacer bars 30 at their lower edges which are welded thereto. Bars 30 project outwardly beyond the walls and have upright lugs 31 for use in retaining a hood (not shown) for enclosing all the driving mechanism to protect it. A transverse support 32 may also be provided across the upper edges of the laterally spaced parallel walls 27. This cover wall may support a suitable drive motor 33 which, through a suitable belt drive 34a and chain drive 34, drives a sprocket 35 keyed on the end of a sprocket shaft 36. This shaft 36 extends transversely through the spaced side walls 27 and is suitably rotatably mounted therein. A drum-sprocket 40 extends between the walls 27 and is keyed on the transverse shaft 36. This sprocket is provided with a series of drive teeth 38 projecting radially from its drum-like periphery which are adapted to project into the openings in the links 15 to drive the links.

The idler section 12 is constructed as indicated best in FIGURES 1a and 3. It is similar to the section 11 but is formed of a single section of sheet metal of U-shape horizontal cross section to provide the opposed upright side plates or walls 39 which are joined together by an integral end wall 41. The side walls 39 rotatably support a transversely extending shaft 44 on which an idler drum 45 is keyed, the drum extending axially between side plates 39. The drum 45 provides a smooth, continuous surface over which the chain 25 passes.

The intermediate feeder sections 13 are all identical and each includes the pair of laterally spaced, upright longitudinally extending side plates 46 of selected length. These plates are joined together in laterally spaced, parallel relationship, as indicated in FIGURE 4, by means of an upper transversely disposed, horizontally extending plate 47. This plate has depending flanges 51 at its opposed longitudinal edges which are bolted to the plates 46 with which the flanges contact. This plate 47 connects the side plates 46 together and serves its main function of providing a continuous wall or web over which the upper run of the chain 25 passes and moves material. The lower edge of each plate 46 is curled upwardly, as at 48, to eliminate any sharp edge which might injure an animal and its upper edge is similarly curled downwardly as indicated at 48a. Also spaced slightly upwardly from the lips 48 on the inner surfaces of the plates 46 are the angle tracks 50 which have vertical flanges bolted to the adjacent inner surfaces of the plates 46 by means of the bolts 49. These tracks 50 are adapted to provide laterally spaced horizontal tracks for receiving and supporting the oppositely projecting ends of the pins 20 provided on the indicated links of the chain 25. It will be noted that the tracks 50 are widely spaced apart a distance slightly less than the length of the transverse pins 20 so that the chain 25 operates in an open space, during its lower run, while its upper run operates over the continuous web or supporting shelf provided by the plate 47.

The various adjacent sections of the feeder are connected together by means of brackets 55. The sections are butted end-to-end and the brackets 55 are vertically disposed in overlapping relationship to these abutting ends and are bolted to the respective upright side plates of the sections by means of some of the removable bolts 49. Each of these brackets 55 carries at its lower end a yoke 52 (FIGURES 4 and 5) which is removably fastened thereto by means of some of the bolts 49. This yoke 52 provides a vertical socket in which one of the legs 14 is slidably mounted. Preferably, the legs are arranged in pairs of opposed legs at opposite sides of the feeder which are connected together by a transversely extending base strap 14a (FIGURE 4) rigidly welded thereto. Adjacent the upper end of each bracket 55 and rigidly secured thereto such as by welding is a guide block 53 which has a vertical opening that slidably receives an adjusting screw 54. This adjusting screw is threaded through a nut 56 which is welded to the lower side of the block 53 and its upper end passes rotatably through an abutment 57 on the upper end of the leg 14. This upper end of the screw above the abutment carries a nut 58 which may be welded thereto. It will be apparent that by rotating the screw by means of the fixed nut 58 the screw threads vertically through the nut 56 to vertically adjust the associated plate 46 to which the block 53 is attached through the bracket 55. The pair of screws 54 carried by the pair of opposed legs 14 are simultaneously adjusted to vertically adjust the associated feeder sections. Thus, these sections can be adjusted in accordance with the level of the floor or other supporting surface and also to vary the elevation of the lower edges 48 of the upright side plates 46 and, consequently, to vary the vertical extent of the access slots or spaces 60 at each side of the feeder through which the animals gain access to the feed, as will be understood more clearly from the later description of the operation of this feeder.

The idler section 12 has an upper baffle or plate 59 extending transversely between the walls 39 to bridge the space between the outer end of the plate 47 of the associated section 13 and the drum 45, as shown in FIGURE 3. Below the drum 45 and inwardly thereof, the section 12 is provided with a chain guide 61 which extends transversely between the walls 39 and curves upwardly and inwardly toward the adjacent ends of the angle tracks 50 of the section 13. To permit for accurate vertical adjustment of the section 12 relative to its adjacent section 13 and thereby dispose the plates 59 and 61 at desired precise levels, the walls 39 are provided with vertical slots 62 for receiving bolts 49. The drive section 11 is provided with similar slots 63 in its side walls for accurate adjustment of the chain guide plate 64 which extends between the side plates 27 thereof and curves inwardly and upwardly from the sprocket drum 40 toward the plate 47 of the associated section 13, as shown in FIGURE 2.

Cover plates 65 are preferably provided for the entire length of the feeder and each may embody a flat sheet metal plate with depending flanges 66 which will straddle and frictionally engage the side plates of the various sections, as illustrated in FIGURES 1 and 1a. These cover plates will serve as a guard to prevent access by the animals to the feed in the top part of the feeder.

As indicated above, this feeder will be installed over a bunk B or over a flat floor. The number of desired intermediate sections 13 will be connected between the end sections 11 and 12, depending on the length of feeder desired. The chain 25 will be adjusted to proper length by insertion of necessary links 15. The screws 54 on the legs 14 will be adjusted to level the various feeder sections with each and also to adjust the vertical extent of the access slots 60 at each side of the feeder. The hopper 26 will be disposed at a selected position along one of the sections 13 so that material can be dropped thereinto and will be directed downwardly between the plates or side walls 46 to deposit on the wall 47 where it will be moved along by the chain 25 which will be driven continuously. The hopper 26 may be fastened in place by some of the bolts 49 passing through locating flanges which straddle the opposed plates or side walls 46.

The chain 25 is of such a nature that it will move the material along the wall or plate 47. In the example shown, each link of the chain is provided with material-moving blades which extend from the shelves 16. On the upper run of the chain these blades extend upwardly. These blades and the shelves 16 which carry them, together with the body of the links, as well as the projecting pins 20, will serve to carry and push the material along the continuous wall 47. Thus, as the material is fed into the hopper 26, it will be carried from beneath it and along the feeder. Assuming the chain is moving towards the idler end 12 of the feeder, as indicated in FIGURE 3, the material will pass around the drum 45 and downwardly into the end of the bunk B. Any material which tends to accumulate in this end of the bunk will be moved along in a reverse direction by the blades of the chain which will be in depending position on the lower run of the chain. The material will build up progressively along the bunk until, as indicated in FIGURE 4, it will accumulate to such an extent that it has a normal angle of repose at each side below the chain 25 and outwardly through the slots 60. If there is an actual bunk B instead of a flat floor surface, spreading of the material will be limited. The build-up of material in the bunk will continue all along beneath the feeder so that animals can get access to it from each side through the slots 60. As an animal eats any material away from the pile, the chain 25 will serve to move more material thereinto to replenish the material at the void. The material will never accumulate beyond the level of the lower run of the chain because if it tends to so accumulate, the chain will carry the excess of material into the end unit 11 and lift it upwardly through that unit and deposit it on the wall 47 to move it along the wall. The accumulation of feed will be kept uniform along the length of the bunk. No jamming of the material along the lower run of the chain will occur because there is substantial space between the link-supporting tracks 50 and the associated links 15. This is true even though the material may be of a type which is difficult to handle such as haylage or grass.

It will be apparent from the above that this invention provides a simple and inexpensive animal feeder which has many advantages. Some of these advantages have been discussed above and others will be readily apparent.

Having thus described this invention, what is claimed is:

An animal feeder comprising a pair of upright side walls held in laterally spaced, longitudinally extending, paralle relationship to provide a passage therebetween for feed, a substantially continuous wall at an upper level in said passage supported between said upright walls, a pair of laterally spaced, opposed tracks at a lower level in said passage, an endless feed-carrying chain disposed in said passage and having an upper run passing along and supported by said continuous upper wall and a lower run passing along and supported by said spaced opposed tracks, said chain moving the feed along said upper wall and depositing it below said tracks, and access spaces along said upright side walls below said tracks to permit access by animals to said deposited feed; said endless chain being composed of links pivotally connected together and which include transversely extending material-moving flights which move the material along the continuous upper wall and which are of lesser lateral extent than the spacing between said side walls and the spacing between said opposed tracks so that there is a space at each side of the upper run of the chain and the respective side wall and at each side of the lower run of the chain between the chain and the respective track through which feed carried by the chain can drop, certain links of said chain carrying laterally outwardly extending support extensions which are of sufficient extent to project laterally into supporting relationship with said tracks without interference with said side walls so as to support the lower run of the chain on said tracks without substantial interference with the dropping of the feed through the spaces adjacent said tracks, said flights of the chain comprising transversely extending shelf portions with outwardly extending material-moving blades which are upright when on the upper run of the chain but are depending when on the lower run of the chain and extend downwardly between said tracks in laterally spaced relationship thereto, said support extensions being in the form of oppositely extending pin portions secured to the shelf portion of a respective link.

References Cited

UNITED STATES PATENTS

| | | | |
|---|---|---|---|
| 2,522,449 | 9/1950 | Inman | 119—52 |
| 2,841,115 | 7/1958 | Weber | 119—52 |
| 2,923,275 | 2/1960 | Buesing | 119—52 |
| 3,108,572 | 10/1963 | Reed | 119—52 |

SAMUEL KOREN, *Primary Examiner.*

HUGH R. CHAMBLEE, *Examiner.*